United States Patent
Bachner et al.

(10) Patent No.: US 11,834,977 B2
(45) Date of Patent: Dec. 5, 2023

(54) METHOD FOR HEATING AN EXHAUST SYSTEM

(71) Applicant: Robert Bosch GmbH, Stuttgart (DE)

(72) Inventors: Michael Bachner, Stuttgart (DE);
Jonas Ernst, Stuttgart (DE);
Rolf-Dieter Koch, Ditzingen (DE);
Tahir Harman, Ludwigsburg (DE);
Thomas Zein, Sindelfingen (DE); Uwe Kossatz, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/988,462

(22) Filed: Nov. 16, 2022

(65) Prior Publication Data
US 2023/0151752 A1 May 18, 2023

(30) Foreign Application Priority Data

Nov. 17, 2021 (DE) .......................... 102021212923.4

(51) Int. Cl.
*F01N 3/20* (2006.01)
*B01D 53/94* (2006.01)
*F01N 3/023* (2006.01)

(52) U.S. Cl.
CPC ....... *F01N 3/2026* (2013.01); *B01D 53/9454* (2013.01); *B01D 53/9495* (2013.01); *F01N 3/023* (2013.01); *F01N 2240/16* (2013.01); *F01N 2900/1404* (2013.01)

(58) Field of Classification Search
CPC .... F01N 3/2026; F01N 3/023; F01N 2240/16; F01N 2900/1404; B01D 53/9454; B01D 53/9495
See application file for complete search history.

(56) References Cited

U.S. PATENT DOCUMENTS

| | | | |
|---|---|---|---|
| 11,092,050 B2* | 8/2021 | Matsumura | F02D 43/00 |
| 2019/0078524 A1* | 3/2019 | Suchta | F01N 3/0238 |
| 2020/0040785 A1* | 2/2020 | Choi | F01N 3/035 |
| 2021/0189982 A1* | 6/2021 | Weiss | F01N 3/2006 |
| 2021/0222638 A1* | 7/2021 | Hirooka | F01N 3/2026 |
| 2022/0025805 A1* | 1/2022 | Webb | F01N 3/027 |

FOREIGN PATENT DOCUMENTS

| | | |
|---|---|---|
| DE | 4132814 A1 | 4/1993 |
| DE | 19504208 A1 | 8/1995 |
| DE | 102009032022 A1 | 1/2011 |
| DE | 102019205127 A1 | 4/2020 |

* cited by examiner

*Primary Examiner* — Brandon D Lee
(74) *Attorney, Agent, or Firm* — Michael Best & Friedrich LLP

(57) ABSTRACT

A method (200) for heating an exhaust system (120) downstream of an internal combustion engine (1) by means of an electric heating device (14, 15). In one example, the method includes determining a current temperature (t_EHC, t_EHC^Us, t_Cat) in the exhaust system (120), determining a heating demand (t_EHC^Des) based on the determined current temperature (t_Cat) and a target temperature, calculating a required amount of heat (Pwr^Des) on the basis of the heating demand and an amount of energy required to heat the electric heating device (14, 15), and controlling (Pwr^Req) the electric heating device (14, 15) to generate the calculated amount of heat.

8 Claims, 2 Drawing Sheets

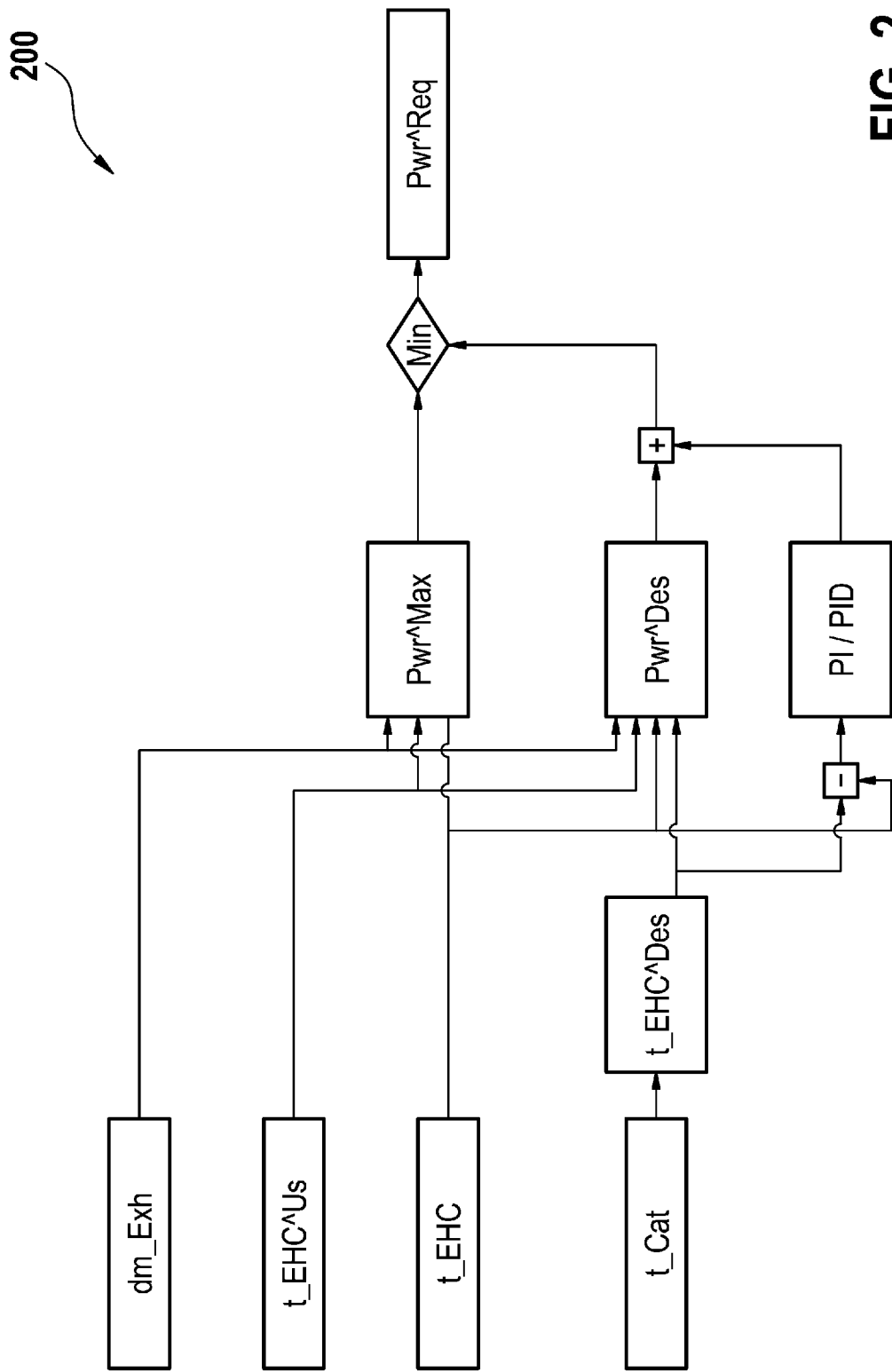

METHOD FOR HEATING AN EXHAUST SYSTEM

BACKGROUND OF THE INVENTION

The present invention relates to a method for heating an exhaust system downstream of an internal combustion engine, as well as to a computing unit and to a computer program for carrying out same.

Three-way catalysts (TWCs), which enable conversion of the relevant gaseous pollutants NOx, HC and CO into harmless products such as Na, $H_2O$ and $CO_2$, can be used to meet statutory emission limits. For such catalytic reactions to proceed as intended, the temperatures in the catalyst must usually exceed the so-called light-off temperature of typically 300-400° C. As soon as this temperature is reached or exceeded, the catalyst converts the relevant pollutants almost completely (the so-called catalyst window).

In order to achieve this condition as quickly as possible, so-called internal engine catalyst heating measures can be applied. The degree of efficiency of the gasoline engine is thereby worsened by late ignition angles, thus increasing the exhaust gas temperature and the enthalpy input into the catalyst. Adapted injection strategies (e.g., multiple injections) can simultaneously ensure combustion stability.

The constant tightening of existing exhaust gas limits and the regulation of additional pollutant components (e.g., ammonia, NH3) is leading to increasing complexity of exhaust gas after-treatment systems, which usually consist of a plurality of catalysts connected in series.

For reasons of installation space, catalysts in the underbody are thus used in addition to those located close to the engine. In addition to the above-mentioned internal engine catalyst heating measures, external catalyst heating measures, for example by means of electrically heatable catalysts or exhaust gas burners, can also be used. Such external heating measures are described, for example, in DE 41 32 814 A1 and DE 195 04 208 A1. They are particularly suitable for quickly heating up components of the exhaust system that are installed remote from the engine to the required operating temperature, since the internal engine heating measures do not take effect in these locations, or do so only after a long time.

SUMMARY OF THE INVENTION

The invention relates to a method for heating an exhaust system downstream of an internal combustion engine, as well as to a computing unit and to a computer program for carrying out said method.

A method according to the invention for heating an exhaust system downstream of an internal combustion engine, e.g. a gasoline or diesel engine or other internal combustion engines such as gas or $H_2$ burners, by means of an electric heating device, comprises determining a current temperature in the exhaust system, determining a heating demand based on the determined current temperature and a target temperature, calculating a required amount of heat on the basis of the heating demand and an amount of energy required to heat the electric heating device, and controlling the electric heating device to generate the calculated amount of heat.

Electric heating devices, also referred to below, without restriction to the specific design of the heating device, as heating disks, which are installed in the exhaust system, enable heat to be introduced into the exhaust system by means of electrical energy from the vehicle electrical system independently of the engine conditions and, in particular, when the engine is (still) at a standstill, which heat is transported by means of the engine exhaust gas mass flow or using externally supplied transport air into the components of the exhaust system arranged downstream of the heating disk(s). However, the electric energy consumption leads to a corresponding load on the electrical system and battery of the vehicle. The method according to the invention makes it possible to minimize energy consumption by requesting and providing the required amount of heat or heating power as precisely as possible.

In particular, the determination of the current temperature and/or the calculation of the required amount of heat is carried out based on a temperature model of the exhaust system.

The use of a model-based (feedforward) control system allows the required heating power to be calculated directly on the basis of physical parameters, for example temperature upstream of and/or in the heating disk, mass flow, mass of the catalyst to be heated, heat capacities, and the like, thereby taking into account all physically relevant influencing parameters. Any additional PID control that may be available as an option only has to correct disturbance variables. Furthermore, a maximum permissible temperature can be defined and conformance thereto can be monitored by means of the temperature model. This allows important components of the exhaust system (e.g., heating disk, catalyst, particulate filter, . . . ) to be protected from detrimental overheating.

The physical equations used in the temperature model to determine the heating disk temperature may be inverted in order to directly determine the heating power required to reach a given target temperature.

Thereby, substantially two superimposed heating processes must be taken into account. One of these is the heating of the mass flow above the heating disk. In addition to the temperature difference, the mass of the gas to be heated and its heat capacity are relevant here. The other is the heating of the heating disk itself. In addition to the temperature difference, the mass and the heat capacity of the heating disk are relevant here:

$$Pwr_{EHC} = dm_{Exh} \cdot c_p \cdot (e_{EHC}^{Des} - t_{EHC}^{Us}) + m_{EHC} \cdot c_{p_{EHC}} \cdot \frac{t_{EHC}^{Des} - t_{EHC}}{t_{i_{HeatUp}}}$$

$Pwr_{EHC}$ designates the power of the heating disk, $dm_{Exh}$ the exhaust gas mass flow passing the heating disk, $c_p$ the heat capacity of the exhaust gas mass flow, $t_{EHC}^{Des}$ the target temperature, $t_{EHC}^{Us}$ the temperature of the exhaust gas mass flow upstream of the heating disk, $m_{EHC}$ the mass of the heating disk, $c_{p_{EHC}}$) the heat capacity of the heating disk, $t_{EHC}$ the current temperature of the heating disk, and $t_{i_{HeatUp}}$ a time constant for the heating process.

The time constant $t_{i_{HeatUp}}$ defines the target temporal course of the heating process (e.g., 10 s). It thus offers a degree of freedom for shaping the dynamic heating process by means of corresponding power requirements and can be varied for further fine optimization depending on the deviation between the target and current temperature of the heating disk, along with the exhaust gas mass flow, if applicable.

Further influences such as convective heat transport are taken into account in the temperature model and can optionally also be taken into account in the feedforward control. However, since they are already implicitly included in the heating disk temperature and are of little importance compared with the heating power requirement for heating the mass flow and the heating disk itself, explicit consideration is not required.

Advantageously, the method further comprises controlling a fluid flow for transporting heat from the heating device to a component of the exhaust system to be heated, wherein the component to be heated comprises in particular a catalyst and/or a particulate filter. It is particularly advantageous here if the fluid flow for extracting heat from the heating device is controlled when the heating device reaches a predeterminable minimum temperature. This achieves a maximum heating speed of the heating device so that the target temperature is reached very rapidly and heat is only supplied to the component to be heated when the heating device is already hot. In this manner, the degree of efficiency of the heating can be maximized and thus the energy demand can be minimized.

Advantageously, the target temperature is determined on the basis of one or more operating parameters of the exhaust system. In particular, the one or more exhaust system operating parameters thereby comprise a pollutant concentration in the exhaust system and/or a pressure drop within the exhaust system and/or an exhaust gas mass flow in the exhaust system and/or an ambient temperature. This allows the appropriate temperature, adapted to the current operating conditions, to be set. For example, an operating temperature of a particulate filter in a normal operation can be lower than an operating temperature during a regeneration of the particulate filter, for which the temperature must be set high enough to burn soot particles.

To determine the target temperature, reference can also be made, for example, to the method from DE 10 2021 208 258 A1, in which a method for determining a feature for characterizing the current ability of the catalyst system to convert pollutants is disclosed. In this case, local conversion capacities for portions or partial volumes of the catalyst are determined on the basis of local temperatures, and from this a global or total conversion capacity of the catalyst or the entire exhaust system (with a plurality of individual catalysts) is determined. Specifically, since the catalysts have a certain heat capacity, once the internal combustion engine is started, not all of the catalyst volume will jump into the thermal operating window at the same time. Instead, the exhaust system with the catalysts will heat up in the direction of flow from front to back, thus gradually increasing the convertible catalyst volume over time. This allows the heating power of the heating disk to be adjusted particularly precisely to the actual demand.

As mentioned earlier, the heating power required to heat both the heating disk itself and the supplied exhaust gas mass flow can be calculated directly by inverting the underlying physical models. Since the main physical influences are taken into account directly, a PID control of the heating disk power can be greatly simplified and, if necessary, eliminated altogether, since only disturbance variables need to be controlled. The dynamic shaping of the heating process can be achieved by corresponding variation of the time constant $t_{i_{Heatup}}$ depending on the deviation between the target and current temperature of the heating disk, along with the exhaust gas mass flow, if applicable (e.g., small time constant and correspondingly high power demand with a large difference to the target temperature or high mass flow, in order to dynamically promote the heating). In particular, operating changeovers, for example for operation without or with transport air mass flow or a stationary/running engine or cold-start heating, temperature maintenance, particle filter regeneration, etc., can thus be omitted and greatly simplify the functional control logic.

The physically modeled heating disk temperatures can also be used directly to limit the maximum allowable heating power (e.g., for component protection). Particularly in real operation with changing boundary conditions, such an approach enables the heating power to be limited in a robust manner and the full potential to be exploited below the limitation. Manufacturer specifications regarding operation with unlimited heating power for a specified period of time can be physically implemented by activating the limitation only from a hysteresis threshold of the current modeled heating disk temperature. Below this threshold, for example, only the nominal heating power, or even the heating power that is slightly increased according to the manufacturer's specification, is limited, which allows the potential of the electric heating disk to be exploited to the maximum.

A computing unit according to the invention, e.g., a control unit of a motor vehicle, is configured, in particular programmatically, to carry out a method according to the invention.

The implementation of a method according to the invention in the form of a computer program or computer program product with program code for carrying out all method steps is also advantageous, since this results in particularly low costs, in particular if an executing control unit is also used for further tasks and is therefore present in any event. Finally, a machine-readable storage medium is provided with a computer program stored thereon as described above. Suitable storage media or data carriers for providing the computer program are, in particular, magnetic, optical and electric storage media, such as hard disks, flash memory, EEPROMs, DVDs, and others. It is also possible to download a program via computer networks (Internet, Intranet, etc.). Such a download can be wired or wireless (e.g., via a WiFi network, a 3G, 4G, 5G or 6G connection, etc.).

BRIEF DESCRIPTION OF THE DRAWINGS

Further advantages and embodiments of the invention can be found in the description and the accompanying drawing.

The invention is illustrated schematically in the drawing on the basis of an embodiment and is described below with reference to the drawing.

FIG. 2 shows an embodiment of a method according to the invention schematically in the form of a simplified flow chart.

DETAILED DESCRIPTION

Figure 1:
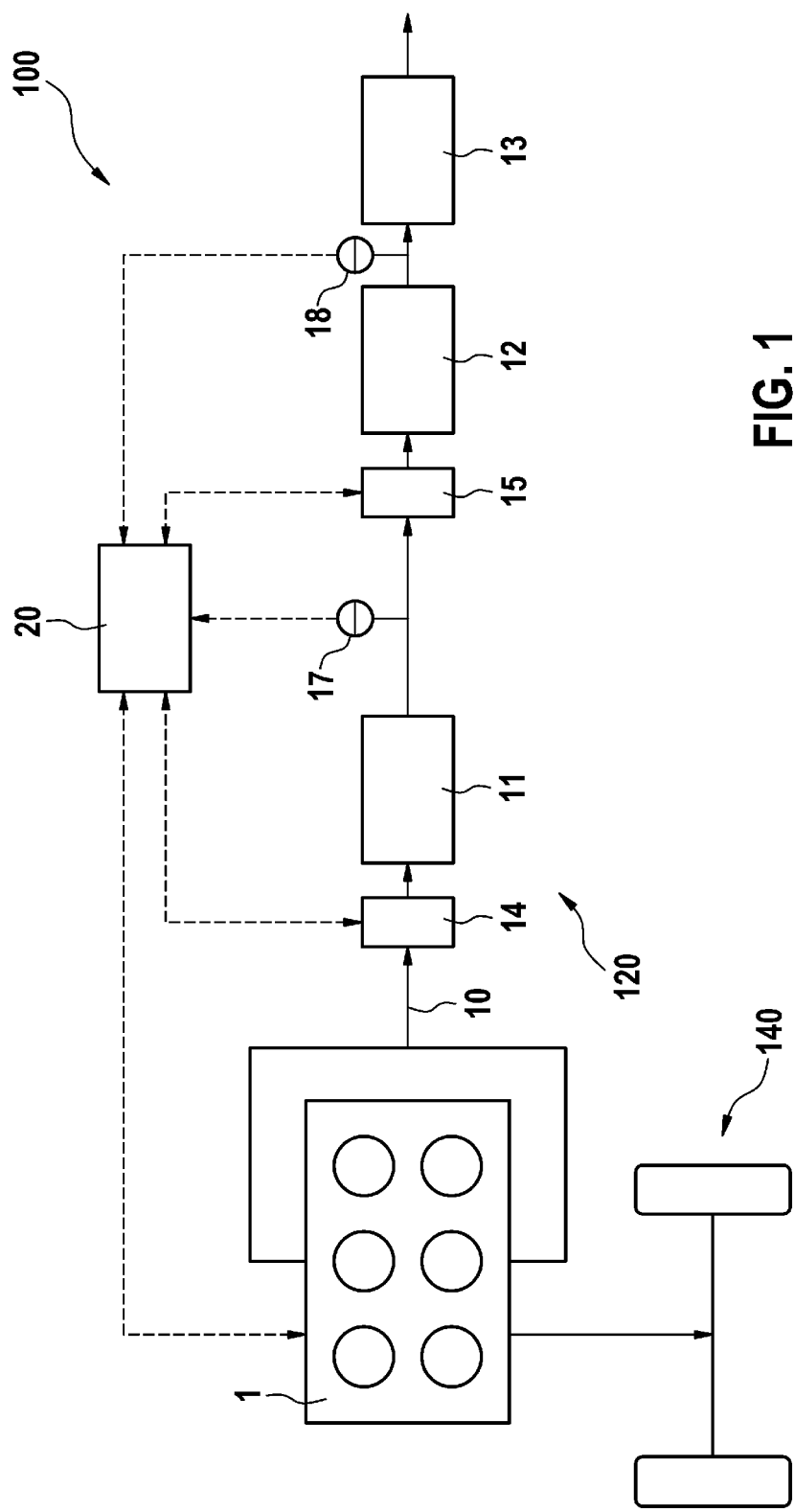
FIG. 1 shows an arrangement with an internal combustion engine and an exhaust system, as may be the basis of the invention.

By way of example, the following description describes an embodiment of the invention based on an exhaust system of a gasoline engine with 3-way catalysts (TWCs) used therein. However, it should be noted that the proposed method is equally suitable for diesel or other internal combustion engines, e.g., gas or H2 burners. Here, the respective burner-specific catalysts are then used instead of a TWC, e.g., oxidation catalyst, SCR, particulate filter, NSC, etc.

In FIG. 1, an arrangement with an exhaust system as can be used within the framework of the invention, for example a vehicle, is shown schematically and designated overall with the number 100.

The vehicle 100 comprises an internal combustion engine 1 used to drive wheels 140 of the vehicle 100, as well as an exhaust system 120 with a plurality of catalysts 11, 12, 13 arranged downstream of the internal combustion engine 1. In the example shown, sensors 17, 18 are arranged downstream of each of the catalysts 11, 12 and are each connected in a data-conducting manner to a computing unit 20, for example a control unit of the vehicle 100. The sensors can detect operating parameters of the exhaust system 120, such as temperatures, exhaust gas compositions, exhaust gas mass flows or the like. Of course, the positions of the sensors 17, 18 shown should only be understood as examples. Furthermore, the number of sensors is also not limited to the two shown. Rather, more or fewer sensors may also be provided.

In the example shown, the computing unit 20 is further connected in a data-conducting manner to the internal combustion engine 1 and to external electric heating devices 14, 15, each of which is associated with one of the catalysts 11, 12, 13. In particular, the electric heating devices 14, 15 may also be arranged directly in the catalyst or within a housing of the catalyst. It should be noted here that at least one electric heating device is required within the framework of the present invention, but a plurality of electric heating devices, as shown in FIG. 1, can of course be used side-by-side and controlled, for example, in each case analogously to one another. In particular, when a plurality of heating devices is used, each can be operated to account only for the heating requirements of components located directly downstream of it and upstream of the next heating device.

Exhaust gas 10 generated by the internal combustion engine 1 is successively fed to the catalysts 11, 12, 13 in order to be purified or decontaminated in them. Each of the catalysts 11, 12, 13 can be provided for a particular decontamination or for a plurality of simultaneous decontaminations. For example, a first catalyst 11, which can be located close to the internal combustion engine 1, may be a three way catalyst (TWC), while a second catalyst 12 and third catalyst 13 may comprise other catalysts and/or purification components such as NOx storage catalysts, SCR catalysts, particulate filters, or the like. However, the second and third catalysts 12, 13 may also comprise one or more additional TWCs. Furthermore, the first catalyst 11 can also comprise one or more other purification components and does not necessarily have to be in the form of a TWC.

Depending on the type of catalyst, each of the catalysts 11, 12, 13 has a specific thermal working range, also referred to as a conversion window. For effective conversion, a predeterminable minimum temperature, also known as the light-off temperature, must be reached. Above the light-off temperature, a conversion of the various pollutants into less harmful substances takes place. However, if necessary, an increase in effectiveness can still be achieved if the relevant catalyst is operated at a temperature that is higher than the light-off temperature. In such a case, a set temperature is advantageously specified for the relevant catalyst 11, 12, 13. As described at the beginning, a control system can generally also be based on thermally active volume fractions of the cleaning components. However, the invention will be described here using an example with a temperature-based control system.

In FIG. 2, an advantageous embodiment of a method according to the invention is shown schematically in the form of a simplified flow chart and denoted by the number 200. For the sake of simplicity, only the control system of a single electric heating device 14 is described here; if there is a plurality of heating devices, each can be operated similarly to the method described here.

The method 200 uses as input variables temperatures of catalyst(s), t_Cat, exhaust gas upstream of the electric heating device, t_EHC^Us, and the heating device, t_EHC, along with an exhaust gas mass flow, dm_Exh. Such input variables can be determined based on sensors and/or models.

Based on the current catalyst temperature t_Cat, a target temperature for the exhaust gas leaving the heating disk is calculated in a step t_EHC^Des. The minimum operating temperature ("light-off temperature") required in the relevant catalyst is taken into account here.

Based on the exhaust gas mass flow dm_Exh, the exhaust gas temperature upstream of the heating disk t_EHC^Us and the current temperature of the heating disk t_EHC, a maximum permissible heating power for the heating device 14 is determined in a step Pwr^Max.

Furthermore, based on the input variables used in the step Pwr^Max and the target temperature determined in the step t_EHC^Des, a heating power desired to achieve the target temperature as efficiently as possible is determined in a step Pwr^Des.

The desired heating power is compared with the maximum permissible heating power in a step Min. The smaller of the two determined heating powers is then output as the heating power requirement and the heating disk is controlled according to the heating power requirement. For this purpose, a corresponding electrical power is supplied to the heating disk from a vehicle electric system of the vehicle 100.

Optionally, the desired heating power as determined in the step Pwr^Des can be corrected (link "+" in FIG. 2) before carrying out the comparison step Min by means of a controller value, which is determined in a step PI/PID based on a difference (link "-" in FIG. 2) between the target temperature and the current temperature of the heating disk t_EHC. However, this is not absolutely necessary due to the already very precise and robust temperature control, since, in the step PI/PID, only disturbance variables with a relatively small influence on the final exhaust gas temperature downstream of the heating disk 14 are compensated for.

It should be emphasized that the method 200 cannot be carried out exclusively with exhaust gas as the heat transfer fluid; rather, externally conveyed fluids, in particular air, can also be used. This is particularly advantageous in situations in which no exhaust gas mass flow is (yet) available, for example in situations in which the vehicle 100 is stationary and/or the internal combustion engine 1 is not being operated (e.g., prior to a departure, during electrically driven travel in hybrid vehicles, . . . ).

The invention claimed is:

1. A method (200) for heating an exhaust system (120) downstream of an internal combustion engine (1) by means of an electric heating device (14, 15), the method comprising:
   determining a current temperature (t_EHC, t_EHC^Us, t_Cat) in the exhaust system (120) on the basis of a temperature model of the exhaust system (120),
   determining a heating demand (t_EHC^Des) on the basis of the determined current temperature (t_Cat) and a target temperature,
   calculating a required amount of heat (Pwr^Des) on the basis of the heating demand, an amount of energy required to heat the electric heating device (14, 15), and the temperature model of the exhaust system (120), wherein the temperature model of the exhaust system (120) comprises a plurality of physical equations, wherein the physical equations are inverted to directly determine the required amount of heat (Pwr^Des), and controlling (Pwr^Req) the electric heating device (14, 15) to generate the calculated amount of heat.

2. The method (200) according to claim 1, further comprising controlling a fluid flow (10) for transporting heat from the heating device (14, 15) to a component (11, 12, 13) of the exhaust system (120) to be heated.

3. The method (200) according to claim 2, wherein the component (11, 12, 13) to be heated comprises a catalyst and/or a particulate filter.

4. The method (200) according to claim 2, wherein the fluid flow (10) for extracting heat from the heating device (14, 15) is controlled if the heating device (14, 15) reaches a predeterminable minimum temperature.

5. The method (200) according to claim 1, wherein the target temperature is determined on the basis of one or more operating parameters of the exhaust system (120).

6. The method (200) according to claim 5, wherein the one or more operating parameters of the exhaust system (120) comprise a pollutant concentration in the exhaust system and/or a pressure drop within the exhaust system and/or an exhaust mass flow (dm_Exh) in the exhaust system and/or an ambient temperature.

7. A system for controlling an exhaust system (120) located downstream of an internal combustion engine (1), the system comprising:
- an electric heating device (14, 15); and
- a computer configured to:
- determine a current temperature (t_EHC, t_EHC^Us, t_Cat) in the exhaust system (120) on the basis of a temperature model of the exhaust system (120),
- determine a heating demand (t_EHC^Des) on the basis of the determined current temperature (t_Cat) and a target temperature,
- calculate a required amount of heat (Pwr^Des) on the basis of the heating demand an amount of energy required to heat the electric heating device (14, 15), and the temperature model of the exhaust system (120), wherein the temperature model of the exhaust system (120) comprises a plurality of physical equations, wherein the physical equations are inverted to directly determine the required amount of heat (Pwr^Des), and
- control (Pwr^Req) the electric heating device (14, 15) to generate the calculated amount of heat.

8. A non-transitory, computer-readable storage medium containing instructions that when executed by aa computer cause the computer to control an exhaust system (120) located downstream of an internal combustion engine (1) and having an electric heating device (14, 15), by:
- determining a current temperature (t_EHC, t_EHC^Us, t_Cat) in the exhaust system (120) on the basis of a temperature model of the exhaust system (120),
- determining a heating demand (t_EHC^Des) on the basis of the determined current temperature (t_Cat) and a target temperature,
- calculating a required amount of heat (Pwr^Des) on the basis of the heating demand an amount of energy required to heat the electric heating device (14, 15), and the temperature model of the exhaust system (120), wherein the temperature model of the exhaust system (120) comprises a plurality of physical equations, wherein the physical equations are inverted to directly determine the required amount of heat (Pwr^Des), and
- controlling (Pwr^Req) the electric heating device (14, 15) to generate the calculated amount of heat.

\* \* \* \* \*